Jan. 10, 1961 P. P. MARTINELLI 2,967,934
APPARATUS FOR MEASURING THE THICKNESS OF A DEPOSIT
Filed April 11, 1956
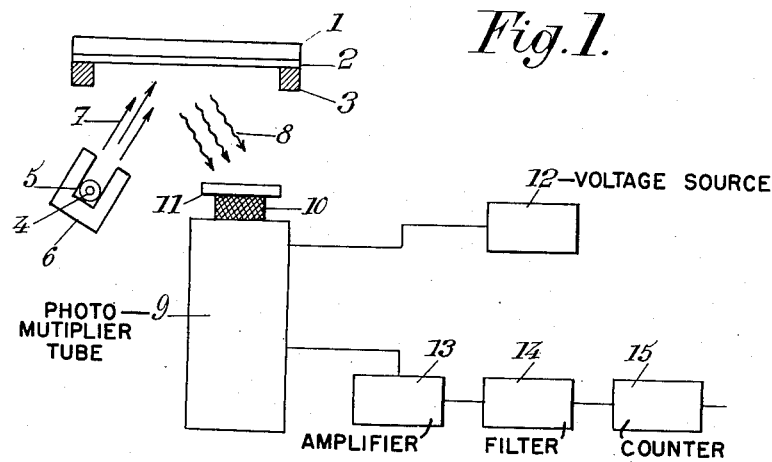
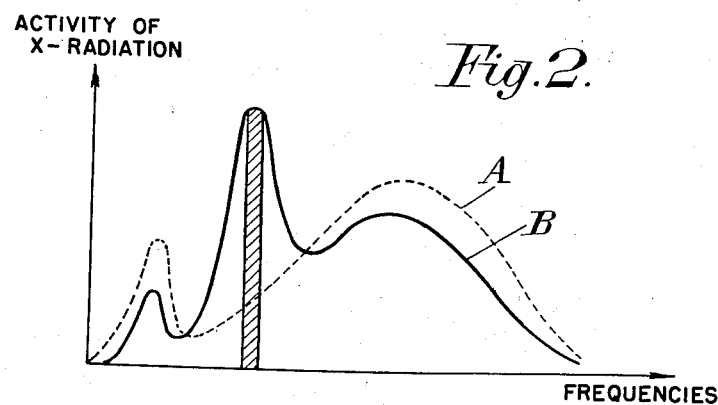
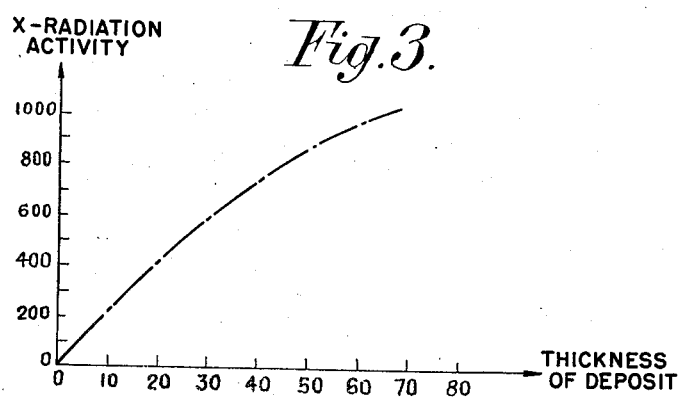

United States Patent Office 2,967,934
Patented Jan. 10, 1961

2,967,934

APPARATUS FOR MEASURING THE THICKNESS OF A DEPOSIT

Pierre Pascal Martinelli, Paris, France, assignor to Commissariat a l'Energie Atomique, Paris, France, a French society Filed Apr. 11, 1956, Ser. No. 577,574

Claims priority, application France Apr. 12, 1955

4 Claims. (Cl. 250—71.5)

The present invention relates to an apparatus for measuring the thickness of a deposit, either metallic or not.

The chief object of my invention is to simplify the means necessary for said measurement.

The non-destructive measurement of the thickness of a layer is of a very great importance, in particular for metallic deposits. It is generally difficult for deposits of non ferromagnetic metals on substances which are also non ferromagnetic.

There are already many methods for measuring the thickness of these deposits. In particular, methods for these measurements have been disclosed, which are of magnetic, chemical, mechanical, electrical, optical, microscopical, spectroscopical or radioactive (X-rays or radioelements) kinds. Each of these methods has a very limited field of application, which reduces its interest. Furthermore, measurements with X-rays necessitate costly apparatus. Finally, measurement by means of beta rays are applicable only when there is a substantial difference between the atomic number of the base element and that of the metal forming the deposit.

According to my invention, in order to measure the thickness of a deposit formed on a base element, I project a beam of beta rays onto said deposit, I detect in the resulting X-ray radiation and X-ray of a wave-length characteristic of the matter of said deposit and I measure the intensity of said X-ray and of radiations ranging in a narrow wavelength containing said X-ray.

The thickness of the layer to be measured must be smaller than the maximum distance that beta rays can travel over in the matter which constitutes said layer. For great thicknesses, this maximum path will be increased by making use of a very hard beta radiation. For small thicknesses, a less intensive radiation will be used, which will permit of improving the sensitiveness of the device.

Preferred embodiments of the present invention will be hereinafter described with reference to the accompanying drawings given merely by way of example and in which:

Fig. 1 shows an apparatus for carrying out the method according to the present invention for measuring the thicknesses of metallic deposits.

Fig. 2 shows the spectrum of the X-radiations emitted on the one hand by the metal of the support of the deposit and on the other hand by this metal support provided with its deposit.

Fig. 3 shows, by way of an example, a curve indicating, for a given metal deposit, the activity measured by the apparatus in accordance with the thickness of the deposit.

In the apparatus illustrated by Fig. 1, a sample constituted by a support carrying the metal deposit the thickness of which is to be measured consists of a plate 1 carrying the metal deposit 2. The whole is mounted in a holder 3.

According to my invention, a source 4 of beta rays is located close to plate 1 on the side thereof which carries the metal deposit 2.

The source 4 is a radioactive isotope and this isotope is then enclosed in a cylinder 5 of a light metal, for instance aluminium or a plastic material capable of resisting the radiation, this cylinder being itself placed in a protective container 6.

The beta rays shown by arrows 7 and coming from source 4 irradiate the metallic deposit 2 which, in turn, emits an X-radiation represented by the wave-shaped arrows 8.

The X-radiation 8 is detected and amplified by a photomultiplier tube 9 fed from a high voltage stabilized source 12, this tube 9 including for instance a crystal 10 of sodium iodide activated by means of thallium.

A screen 11 of a light material (for instance a plastic material, aluminium, beryllium), intended to stop the parasitic beta rays due to braking of the electrons which constitute the incident beta rays and to retrodiffusion thereof by the metallic deposit 2 and the surrounding objects, is located across the path of travel of the X-rays ahead of the photomultiplier tube 9.

Connected with this photomultiplier tube 9 there are an amplifier 13, a filter 14 for selecting a given wave-length and counting means 15. Amplifier 13 serves to amplify the effects of the radiation of the metal which consitutes the deposit 2; filter 14 selects the desired energies (frequencies) and counting means 15 permit of determining the thickness of the deposit, in accordance with the intensity measured by said counting means.

The means 15 for counting the intensities or activities (that is to say the numbers of impulses received in the apparatus per unit of time) may for instance consist of a scaling circuit, a counting rate meter, or an integrator, capable of summing up the various activities corresponding to the band selected by filtering means 14. Advantageously, use is made of an apparatus permitting a direct reading of the thicknesses of the deposit 2.

Comparison with a standard apparatus permits of periodically checking up the adjustment of the measurement apparatus and of readjusting it if necessary.

On Fig. 2 I have shown the spectrum of the X-radiation that is detected. On this curve, the frequencies or energies are plotted in abscissas. In ordinates are plotted, for each band to which the filter 14 is successively tuned, the corresponding value of the activity. By varying the adjustment of filtering means 14, the whole range of energies (or frequencies) is scanned and the curve is traced.

Curve A relates to the radiation obtained with the support 1 alone. Curve B relates to the same radiation with a metal deposit applied on said support.

In order to trace the curves, the filtering means 14 are successively tuned to all the energies (or frequencies) of the X-rays that are detected, which indicates one or several X-rays characteristic of the matter of the deposit and having a relatively intense activity as compared with the remainder of the spectrum.

I then choose one of these rays and I adjust filtering means 14 so that it may permit the transmission through a narrow band including said rays. The activity of this band is measured, this activity corresponding to the cross-hatched region of curve B.

This activity is much higher than that corresponding to the support alone, and it depends upon the thickness of the deposit.

Since the nature of the deposit is often known, it is possible to know in advance the energy (or frequency) of one of the characteristic X-rays thereof, which facilitates selection. The filtering means may even be left adjusted to correspond to a well determined ray if a whole series of measurements corresponding to deposits of the same nature is effected.

Fig. 3 shows the type of curve which indicates, for a given support 1 carrying a given metal deposit, the activity measured by the apparatus in accordance with the thickness of the deposit. This curve is made by plotting in abscissas the thickness of the deposit and in ordinates the activity of the X-radiation.

By way of example, the curve of Fig. 3 was obtained experimentally by making use of a support constituted by a copper plate carrying a gold deposit of variable thickness. I used a source of beta rays constituted by strontium 90 the period of which is twenty-five years, this strontium being placed in an aluminium cylinder, itself placed inside a bismuth container. The detecting means consisted of a photomultiplier provided with a crystal of sodium iodide activated by means of thallium. The screen placed at the input end of said photomultiplier was made of a plastic material. The passing-band of the filtering means had a width of 10 kiloelectron volts. The apparatus further included an integrator and a registering electronic potentiometer.

The curve of Fig. 3 relates to this example. The activity plotted in ordinates was counted in number of impulses per minute. The thickness of the deposit, plotted in abscissas, was counted in microns.

Of course, the method above described for measuring the thickness of a metallic deposit by means of beta rays is a general method. It may be used whatever be the metal that is deposited, whatever be the source of beta rays and whatever be the means used for detecting the X-ray that is a characteristic of this metal and for filtering the corresponding energies (or frequencies). All modifications may be used within the scope of my invention.

The means used for making the apparatus according to my invention are extremely simple and it is possible to make use of long period radioactive sources. Furthermore it is possible to eliminate practically the whole of the parasitic radiation coming from the braking of the electrons which constitute the beta radiation and from their retrodiffusion into the piece that is examined and the surrounding objects.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present as comprehended within the scope of the accompanying claims.

What I claim is:

1. An apparatus for measuring the thickness of a deposit formed on a support which comprises, in combination, means for projecting a beam of beta rays onto said deposit, means for detecting the X-rays emitted from said deposit, screen means interposed between said deposit and said detecting means to stop parasitic beta rays travelling toward said detecting means and means connected with the output of said detecting means for measuring the intensity of the radiations received at said detecting means that range in a narrow frequency band containing an X-ray characteristic of the matter of said deposit.

2. In an apparatus according to claim 1 in which said means for projecting a beam of beta rays include a source of beta rays constituted by a radioactive isotope, a cylinder of a light material surrounding said source and a container surrounding said cylinder.

3. An aparatus according to claim 1 in which said screen means consist of a screen of a light material of the group consisting of a plastic material, aluminium and beryllium.

4. An aparatus according to claim 1 in which the means for detecting the X-ray radiation is a photomultiplier including a crystal of sodium iodide activated by means of thallium.

References Cited in the file of this patent

UNITED STATES PATENTS

| | | |
|---|---|---|
| 2,642,537 | Carroll et al. | June 16, 1953 |
| 2,675,478 | Brunton et al. | Apr. 13, 1954 |
| 2,675,479 | Stewart et al. | Apr. 13, 1954 |
| 2,711,480 | Friedman | June 21, 1955 |

OTHER REFERENCES

Beta-Ray Excited Low-Energy X-ray Sources, by L. Reiffel, from Nucleonics, March 1955, pages 22–24.

Leveque et al.: "Peaceful Uses of Atomic Energy," Proceedings of the International Conference on the Peaceful Uses of Atomic Energy, vol. 15, 1956, pages 142–146.